(12) United States Patent
Zweig

(10) Patent No.: US 7,196,691 B1  
(45) Date of Patent: Mar. 27, 2007

(54) MULTI-KEY MACROS TO SPEED DATA INPUT

(76) Inventor: Bruce Martin Zweig, P.O. Box 330430, San Francisco, CA (US) 94133

( * ) Notice: Subject to any disclaimer, the term of this patent is extended or adjusted under 35 U.S.C. 154(b) by 281 days.

(21) Appl. No.: 10/295,779

(22) Filed: Nov. 15, 2002

Related U.S. Application Data (60) Provisional application No. 60/332,989, filed on Nov. 14, 2001.

(51) Int. Cl.  
G09G 5/00 (2006.01)

(52) U.S. Cl. .................... 345/168; 345/169; 345/170; 345/173; 345/179

(58) Field of Classification Search ............... 345/358, 345/156, 157, 168–183; 455/564, 90; 704/256, 704/270; 364/419.15; 710/67; 715/534, 715/716; 235/470; 341/22  
See application file for complete search history.

(56) References Cited

U.S. PATENT DOCUMENTS

| | | | |
|---|---|---|---|
| 4,638,306 A | | 1/1987 | Rollhaus et al. |
| 4,672,186 A | * | 6/1987 | Van Tyne .................... 235/470 |
| 4,694,280 A | | 9/1987 | Rollhaus et al. |
| 4,891,786 A | * | 1/1990 | Goldwasser ................. 715/534 |
| 5,384,825 A | * | 1/1995 | Dillard et al. ............... 455/564 |
| 5,535,421 A | * | 7/1996 | Weinreich .................... 710/67 |
| 5,805,911 A | * | 9/1998 | Miller ......................... 715/534 |
| 5,855,002 A | * | 12/1998 | Armstrong .................. 704/270 |
| 5,903,259 A | * | 5/1999 | Brusky et al. .............. 345/168 |
| 6,094,197 A | * | 7/2000 | Buxton et al. .............. 715/863 |
| 6,331,850 B1 | * | 12/2001 | Olodort et al. .............. 345/168 |
| 6,401,065 B1 | * | 6/2002 | Kanevsky et al. .......... 704/256 |
| 6,650,254 B1 | * | 11/2003 | Rix ............................. 341/22 |
| 6,809,724 B1 | * | 10/2004 | Shiraishi et al. ............ 345/169 |
| 6,943,776 B2 | * | 9/2005 | Ehrenburg .................. 345/168 |
| 2002/0167494 A1 | * | 11/2002 | Sherman et al. ............ 345/168 |
| 2002/0193080 A1 | * | 12/2002 | Komsi et al. ................. 455/90 |
| 2004/0169642 A1 | * | 9/2004 | Olodort et al. .............. 345/168 |
| 2005/0104867 A1 | * | 5/2005 | Westerman et al. ......... 345/173 |
| 2005/0235210 A1 | * | 10/2005 | Peskin et al. ............... 715/716 |

\* cited by examiner

*Primary Examiner*—Bipin Shalwala  
*Assistant Examiner*—Prabodh Dharia  
(74) *Attorney, Agent, or Firm*—Buchanan, Ingersoll & Rooney, LLP (57) ABSTRACT

Systems for initiating the execution of a macro by simultaneously depressing multiple keys and for reducing the misclassification of keyboard input by distinguishing between rollovers in normal typing and the simultaneous depression of two keys. Only keystrokes that follow a pause are considered candidates for macro initiation. Keystrokes not separated by a pause are dispatched to the operating system for normal processing. If a user types in a normal fashion, no macro is recognized, and the user experiences no unexpected behavior. A user dictionary of macro definitions is used to determine whether the first keystroke is part of a macro input pair.

23 Claims, 8 Drawing Sheets

MULTI-KEY MACROS TO SPEED DATA INPUT

This application claims the benefit of the filing date(s) of the following earlier application(s):

U.S. Provisional Patent Application No. 60/332,989, entitled, "Two-Key Keyboard Macros," filed November, 14, 2001, naming Bruce M. Zweig as the sole inventor.

U.S. Provisional Patent Application No. 60/332,989 is incorporated by reference herein.

This invention relates to computer input, keyboards and typing. More particularly, this invention relates to speeding input to a computer through multi-key keyboard macros and, in the process, disambiguating rollover and multi-key macro initiation.

BACKGROUND

Currently, a computer user enters data by keyboard, that is, by typing. To enter a system command or move the cursors, for example, the user moves her hand out of the home-row position.

System commands are menu selections by mouse, menu commands combining the Alt key with an alphabetic character (in the Microsoft Windows™ operating system) or shortcuts combining the Ctrl key and another character. All of these methods require the user to move her hands off of the normal home-row position to press the Ctrl or Alt key or to move the mouse. Also, a user generally glances away from the screen to the keyboard or mouse to enter the command, and the user generally glances down again to return her hand(s) to (the correct position on) the keyboard. The moving of the hands from the home-row position and the pausing to look at the hands slows the entry of data. Where the entry of data is time sensitive, the slow data entry is particularly critical.

Therefore there is a need to allow a user to more efficiently enter system commands. There is a need to allow a user to enter system commands without moving her hands from the home row position or moving her eyes from the monitor.

To achieve a high level of commercial success, a computer input system must operate with an extremely low error rate. Users have been reluctant to accept input error rates on the order of even 2%. Witness, for example, the failure of speech-input systems to achieve any significant degree of market acceptance.

Therefore there is a need to allow a user to more efficiently enter data with an extremely low error rate.

Macros are a prior-art means for entering input through a keyboard. Generally speaking, macros are an association of an invocation sequence and a data sequence. The data sequence is typically much longer or much more complex than the invocation sequence. When a user types the macro invocation sequence (macro input sequence, macro activation sequence), software recognizes that sequence and replaces the invocation sequence with the associated data sequence. The user is thereby spared having to type or even remember the longer or more complex data sequence.

Macros are not an error-free proposition, particularly where the invocation sequence is the simultaneous depressing of multiple keys. There are two types of macro input classification errors: a false positive, in which two sequential keystrokes are misclassified as simultaneous keystrokes, and a false negative, in which two simultaneous keystrokes are misclassified as sequential.

Accordingly, there is a need to allow a user to more efficiently enter data with an extremely low error rate, including eliminating as much as possible the misclassification of her input.

In the Microsoft Word™ word processor, the sequence Ctrl-[decreases the font size of a selection and Ctrl-] increases the font size of a selection. For a typical user, these keystrokes are not easily remembered.

Accordingly, there is a need for macro-invocation sequences that are more easily remembered.

Rollhaus et al., U.S. Pat. No. 4,638,306 (1987) and the related Rollhaus et al., U.S. Pat. No. 4,696,280 (1987) (together, "Rollhaus et al." herein) teach keyboard entry. Rollhaus et al. respond to conventional sequential activation of individual keys, outputting individual letters associated with the activated keys. Rollhaus et al. also respond to chords of simultaneously activated multiple keys, using these chords to retrieve stored words from a dictionary. The stored words rather than the entered chords are treated as input. Rollhaus et al. allow an user to use enter both conventional key sequences and key chords. Feedback alerts the user of inadvertent chords.

Rollhaus et al. however, do not recognize autorepeat key events. Rollhaus et al. do not work with keyboards or operating systems with this feature.

Also, Rollhaus et al. have no provision to minimize false negatives. Rollhaus et al. determine macro invocation from the difference between the time of the last key down and the time of the last key up. If this difference is above a threshold, Rollhaus et al. assume a macro has been invoked.

These and other goals of the invention will be readily apparent to one of ordinary skill in the art on reading the background above and the description below.

SUMMARY

Herein are taught methods and apparatus for initiating the execution of a macro by simultaneously depressing multiple keys and for reducing the misclassification of keyboard input by, for example, distinguishing between rollovers in normal typing and the simultaneous depression of two keys. In one embodiment, only keystrokes that follow a pause are considered candidates for macro initiation. Keystrokes not separated by a pause are dispatched to the operating system for normal processing. If a user types in a normal fashion, no macro is recognized, and the user experiences no unexpected behavior.

In one embodiment, the method includes examining a user dictionary of macro definitions to determine whether the candidate keystroke is the first keystroke of a macro's input pair. If it is not, or if the succeeding keystroke does not complete the initiating input pair of any defined macro, or if the two keys are not pressed simultaneously, the keystroke(s) are dispatched to the operating system for normal processing. The method includes generating a probability that the two keystrokes are simultaneous.

DESCRIPTION OF SPECIFIC EMBODIMENTS

Figure 6:
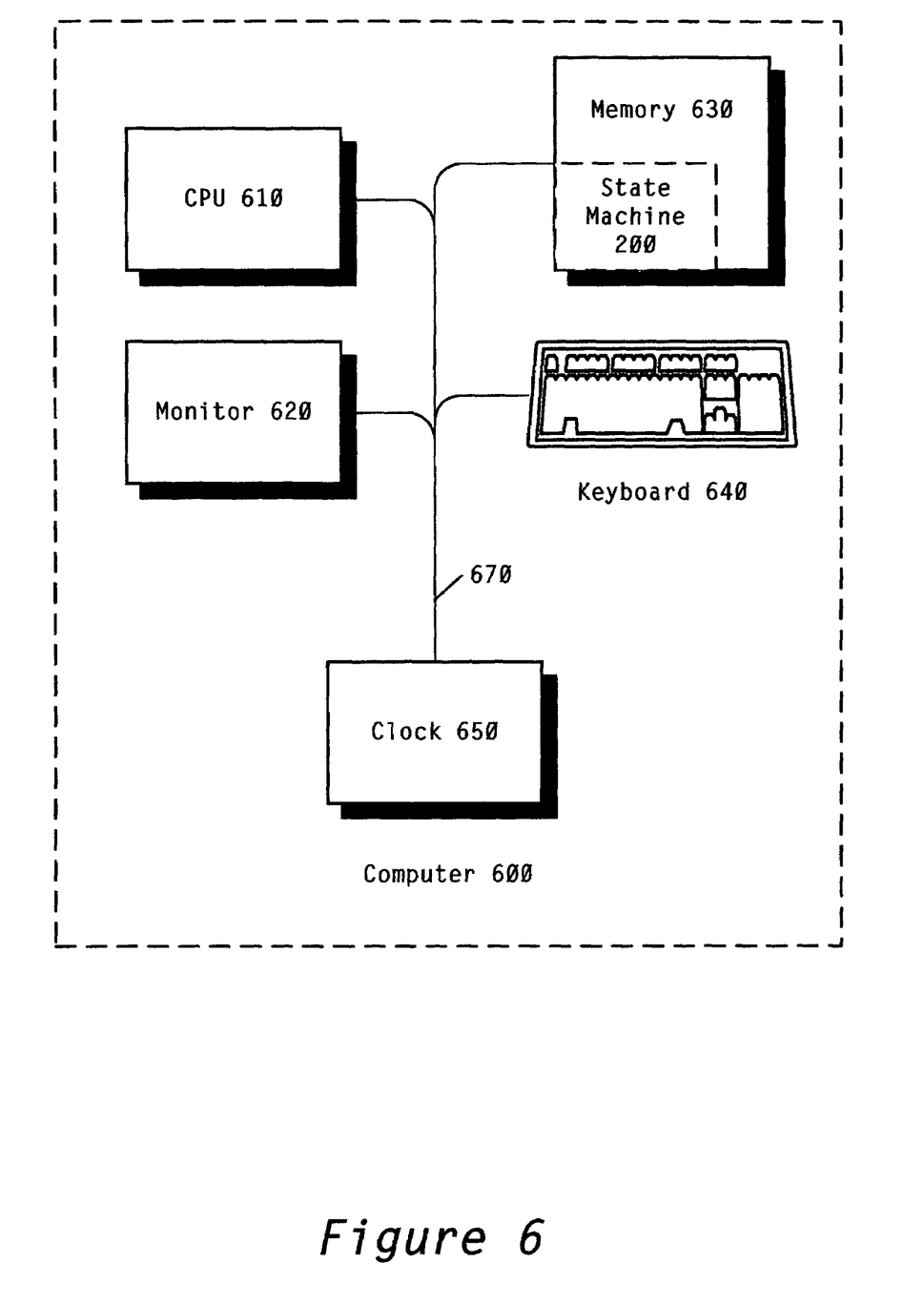
FIG. 6 illustrates a computer system 600 incorporating an embodiment of the invention.

FIG. 6 illustrates a computer 600 incorporating an embodiment of the invention. Well known in the art, the hardware of the system 600 typically includes a CPU 610, monitor 620, memory 630, keyboard 640, clock 650 and a bus 670. The bus 670 communicatively couples these computer components. As is well-known in the art, the computer 600 may associate timing signals from the clock 650 with input from the keyboard 640.

The memory 630 typically includes software (user-level applications, an operating system and drivers for example) and files (both user and system, not shown). Keyboard drivers are well known in the art and thus not fully described herein.

The memory 630 includes drivers, macro definitions (associations) and user preferences more specific to this invention. A keyboard driver maybe modified to incorporate the instant invention, for example, by implementing a state machine 631 as described herein.

Figure 1:
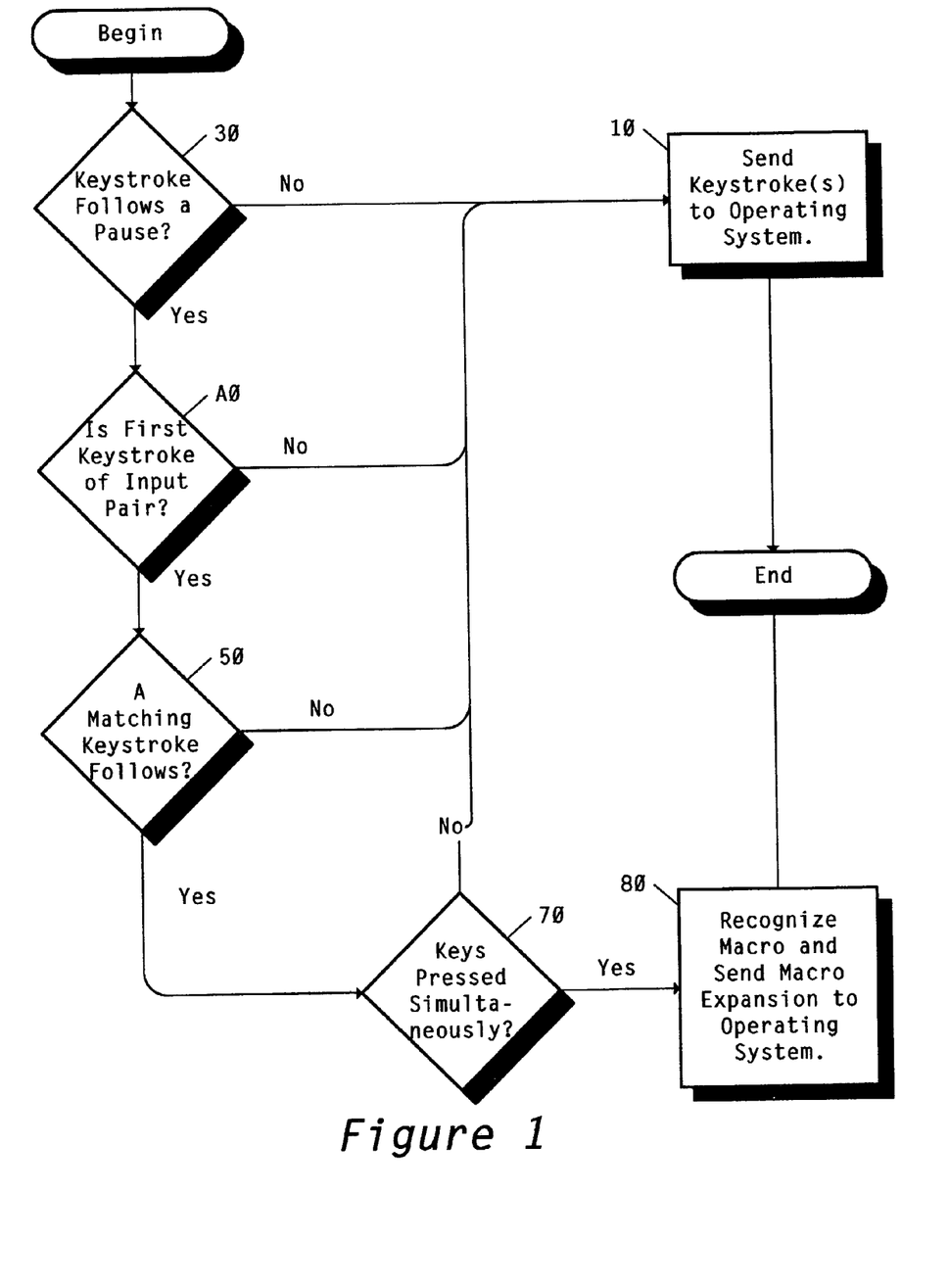
FIG. 1 is a flowchart summarizing the flow of control in the state machine 631 in one embodiment of the invention.

FIG. 1 is a flowchart summarizing the flow of control in the state machine 631. The control begins when the state machine 631 receives a keystroke.

The driver 631 classifies the keyboard input, distinguishing between rollovers in normal typing and the simultaneous depression of two keys. The driver determines whether a keystroke follows a pause, step 30. The driver 631 forwards keystrokes not separated by a pause to the operating system for normal processing, step 10. Only keystrokes preceded by a pause are considered candidates for macro initiation. If a user types in a normal fashion, no macro is recognized, and the user experiences no unexpected behavior.

The driver 631 examines a user dictionary of macro definitions to determine whether the candidate keystroke is the first keystroke of a macro's input pair, step A0. If it is not, or if the succeeding keystroke does not complete any candidate input pairs, step 50, or if the two keys are not pressed simultaneously, step 70. the keystroke or keystrokes are dispatched to the operating system for normal processing, step 10.

Figure 7:
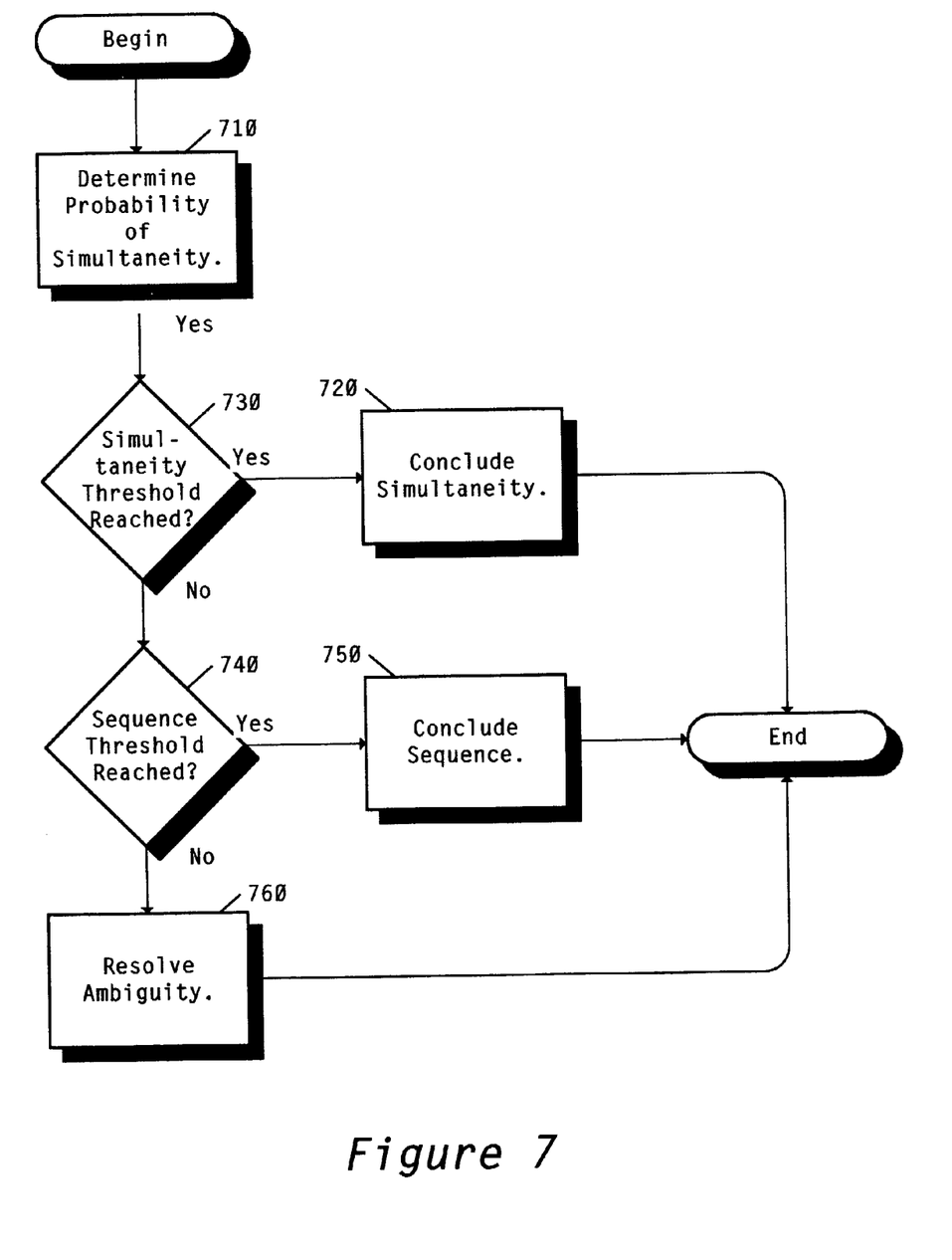
FIG. 7 is a flowchart summarizing the determination of simultaneity, according to one embodiment of the invention.

FIG. 7 is a flowchart summarizing the determination of simultaneity, according to one embodiment of the invention. To determine simultaneity, step 70, in one embodiment, the driver 631 determines the probability that the keystrokes are simultaneous, step 710. If the probability is sufficiently high, step 730, then the driver 631 determines the keystrokes unambiguously simultaneous, step 720, and expands the associated defined macro and forwards the expansion to the operating system, step 10. Keystrokes that the driver 631 determines are sequential, steps 740 and 750, it dispatches to the operating system, step 10.

Figure 8:
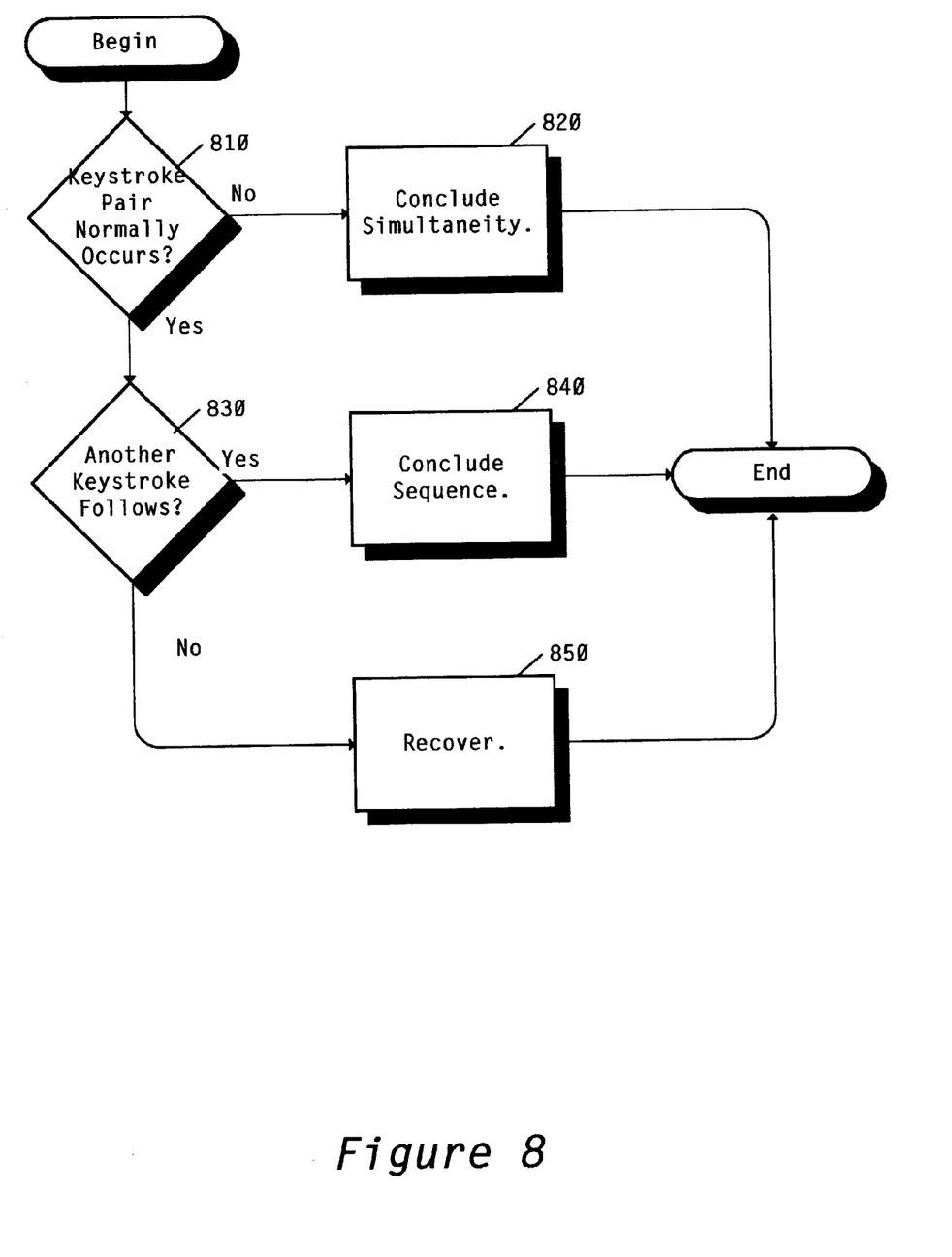
FIG. 8 is a flowchart summarizing the resolution of ambiguity of keystrokes, according to one embodiment of the invention.

If the driver 631 determines the keystroke sequence ambiguous, then the driver 631 attempts to resolve the ambiguity, step 760. FIG. 8 is a flowchart summarizing the resolution of ambiguity of keystrokes, according to one embodiment of the invention. If the keystroke pair appears on a list of keystroke pairs that do not occur in normal typing, step 810, then the driver determines the keystrokes to be simultaneous, step 820. (This list is part of a user's preferences, in one embodiment.) If the pair does not appear on the list, and if a third keystroke shortly follows the pair, step 830, the driver determines the keystrokes to be sequential, step 840.

If the ambiguity cannot be resolved, then several recovery actions, step 850, are possible. In one embodiment, the ambiguous keystrokes are discarded. Since the user has paused before and after the sequence, the user may notice the lack of output and unambiguously repeat the keystroke sequence.

In another embodiment, the macro is recognized and expanded. The expansion is passed on to the operating system.

In yet another embodiment, a user may determine which of these two actions the driver should take in the face of unresolved ambiguity. A dialog box may be displayed, asking the user to choose whether to invoke the macro.

Figure 2:
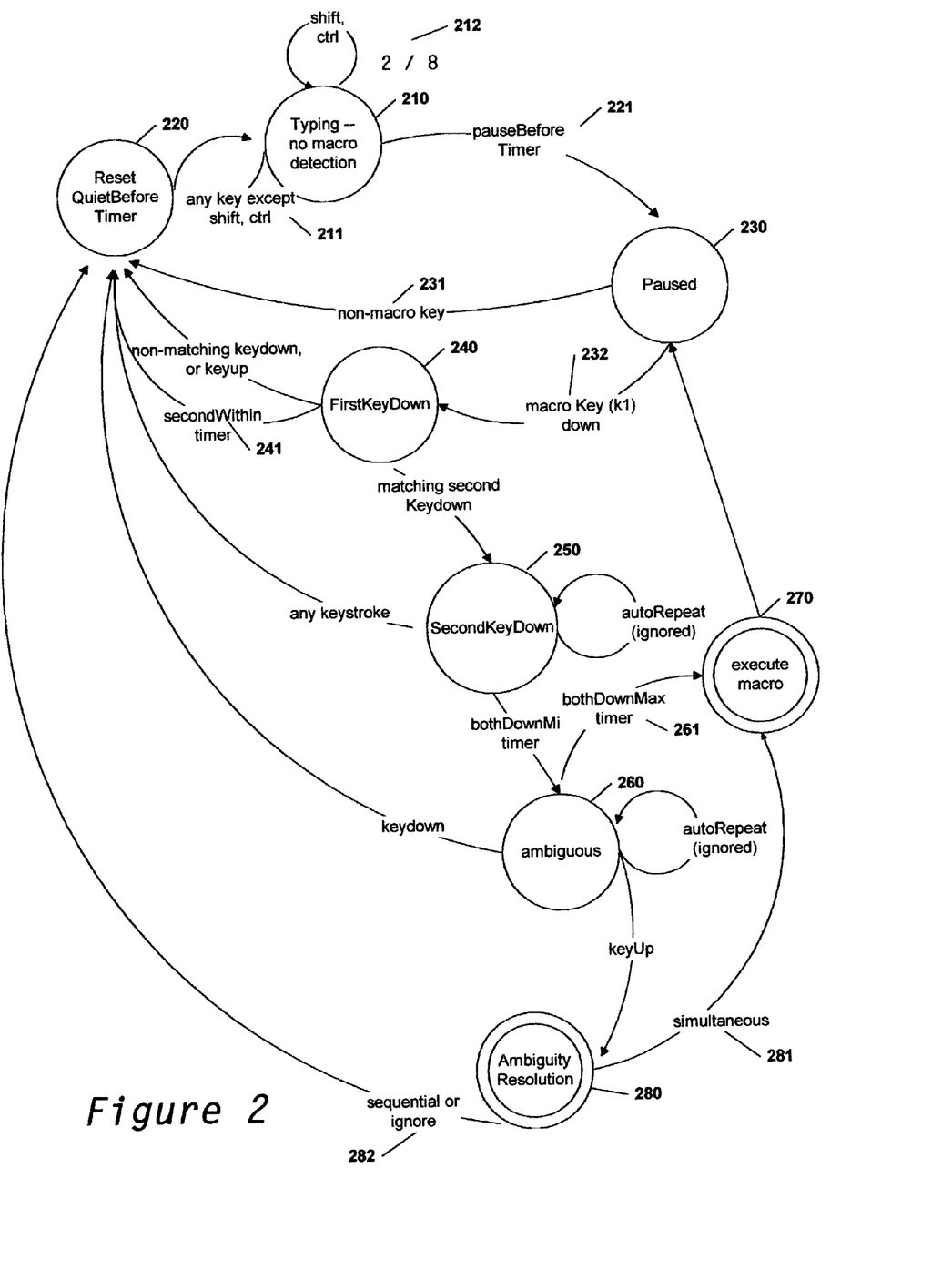
FIG. 2 illustrates a state machine 631 incorporating an embodiment of the invention.

The state machine 631 maintains several timers: a PauseBeforeMacro timer, a SecondKeystrokeWithin timer, a BothKeysDowrMinimum timer, a BothDownMaximum timer, an AcceptOneKeyLifted timer and a QuietAfterMacro timer. Each of these timers is described in turn below.

Tables 2A–2C show that a user generally pauses for 200–1 000 ms before simultaneously striking the two keys in a macro-activation sequence and then pauses again before resuming normal typing. Therefore, the state machine 631 only considers two-character sequences preceded by a pause as candidates for a macro and requires a pause afterwards if the data are ambiguous. The pauses before and after (the latter as necessary) reduce false positives. A typist rarely pauses, quickly types two characters (with rollover) and then pauses again. (Certain two-character words, most notably "we," are exceptions and specially treated.)

The PauseBeforeMacro timer fires when typing has ceased for a predetermined amount of time. In one embodiment, the PauseBeforeMacro time is 200–1000 ms, depending on the user's typing speed as shown in Table 1. Similarly, the QuietAfterMacro timer fires when typing has ceased for a predetermined amount of time. The QuietAfterMacro time is the same as the PauseBeforeTime time in one embodiment.

The SecondKeystrokeWithin timer holds the maximum amount of time that can elapse between two keypresses if a user attempts to press two keys simultaneously. SecondKeystrokeWithin has a value of 5–0100 ms. The value depends on the degree of friction experienced by a key during a keypress. Small variations in the friction experienced by different keys result in a delay between the registration of the two keyDown events when two keys are pressed simultaneously, and this requires a higher value for the parameter. Keyboards with a minimal amount of friction operate with a value toward the lower limit. The SecondKeystrokeWithin time is 75 ms in one embodiment.

The BothKeysDownMinimum timer holds the minimum amount of time that two keys need to be down to be potentially (not conclusively) simultaneous. The BothKeysDowrMinimum time is ranges from 30 to 50 ms, depending on the keydown time of the second keystroke (t2d). Since the second keystroke's keydown time can range from 0 to SecondWithin, in one embodiment, a linear interpolation yields the formula of Equation (1):

$$BothKeysDownMinimum=30+20*(t2d/SecondWithin) \quad (1)$$

The BothKeysDownMaximum timer holds the additional time, beyond BothKeysDownMinimum, that two keys need to be down to conclusively conclude the key sequence as simultaneous key presses. The BothKeysDownMaximum time is 45 ms in one embodiment.

The AcceptOneKeyLifted timer relates to the user pressing two keys simultaneously and then lifting one up in order to execute the macro one time. If the user subsequently depresses the lifted key before releasing the held key, the macro is repeated. This feature is particularly useful in cursor movement. This timer has a value which is greater than the time one key is lifted during a rollover, and is 50 ms in one embodiment.

FIG. 2 illustrates a state machine 631 incorporating an embodiment of the invention. The state machine has the following states: Typing 210, Paused 230, FirstKeyDOwn 240, SecondKeyDown 250, Ambiguous 260, ExecuteMacro 270, and AmbiguityResolution 280. Each of these states is described in turn below.

The Typing state 210 is the initial and default state of the state machine 631. On entering the Typing state 210, the machine 631 forwards any keystrokes held as macro candidates to the operating system and sets the PauseBeforeMacro timer. With each keystroke received, the machine 631 resets the PauseBeforeMacro timer, transition 211. (The exceptions are the modifier keys Shift, Alt, Ctl and, optionally, Oriental character set keys 212 such as Hangul, Hanja, Junja, Kana and Kanji, transition 212.) As long as the machine 631 receives keystrokes before the PauseBeforeMacro timer fires, the state remains Typing 210. The machine 631 forwards these keystrokes to the operating system. As long as the user types in a nearly continuous manner, no macro detection occurs, and the keyboard behaves in the fashion of the prior art.

When the PauseBeforeMacro timer fires, the machine 631 detects that the user has paused and enters the Paused state 230, transition 231.

In the Paused state 230, the state machine 631 evaluates keystrokes as candidates for activating macros. If the machine 631 receives a keypress for a key which is not part of a macro invocation pair, the machine 631 returns to the Typing state 210 to await another pause by the user, transitions 231 and 222. If, on the other hand, the keypress corresponds to one of the keys in any invocation pair, the machine 631 stores the associated key code and keydown time (t1d) and then transitions to the FirstKeyDOwn state 240, transition 232.

In the FirstKeyDOwn state 240, the machine 631 sets the SecondKeystrokeWithin timer. If this time elapses with no additional keystrokes, if the first keypress is lifted or if a second keydown occurs for a key which does not appear in any of the macro-activation key pairs in the macro-activation list, then the state machine 631 transitions back to the Typing state 241, transitions 241 and 242.

If, however, the machine 631 receives a keydown and that key matches the mating key of a macro-activation key pair associated with the first keypress, then the machine 631 stores the second keypress and its keydown time and transitions to the SecondKeyDown state 250, transition 243.

In the SecondKeyDown state 250, the machine 631 sets the BothKeysDownMinimum timer. If the machine receives any keystroke before this time elapses, the machine 631 returns to the Typing state 210, transition 251. If not, the machine 631 transitions to the Ambiguous state 260, transition 252. The machine 631 ignores autorepeat keydown events (events whose character codes match the first or second keypresses, transition 253).

To have gotten to the Ambiguous state 260, the machine 631 has experienced two keydown events. In this state, the machine 631 sets the timer BothKeysDownMaximum. If this interval passes with no intervening keyup or keydown events, then both keys will have been down for a total of the BothKeysDownMinimum and BothKeysDownMaximum times, 75–95 ms in one embodiment. Tables 2A–2C shows that this amount of time suffices to unambiguously classify the sequence as a macro activation. Accordingly, the machine 631 transitions to the ExecuteMacro state 270, transition 261.

If, however, a keyup event occurs before BothKeysDownMaximum ms elapses, then the machine 631 stores the keyup time (tUp) and the identity of the key and then transitions to the AmbiguityResolution state 280, transition 262.

If a keydown event occurs in the Ambiguous state 260, then the state machine 631 assumes a three-key rollover and transitions back to the Typing state 210, transitions 261 and 222. The Typing state 210 releases the three keystrokes analyzed.

In the ExecuteMacro state 270, the machine 631 expands the macro according to the macro dictionary, forwarding the macro associated with the simultaneous keystrokes on to the operating system.

In the AmbiguityResolution state 280, the machine 631 tests the input sequence to determine whether the sequence is simultaneous. If the machine 631 classifies the sequence as simultaneous, then the machine transitions to the ExecuteMacro state 270, transition 281. If the machine 631 classifies the sequence as sequential, then the machine 631 transitions back to the Typing state 210, transition 282 and 222, where keypresses are forwarded to the operating system. If the machine 631 cannot disambiguate the sequence, it attempts to recover as described herein.

Figure 3:
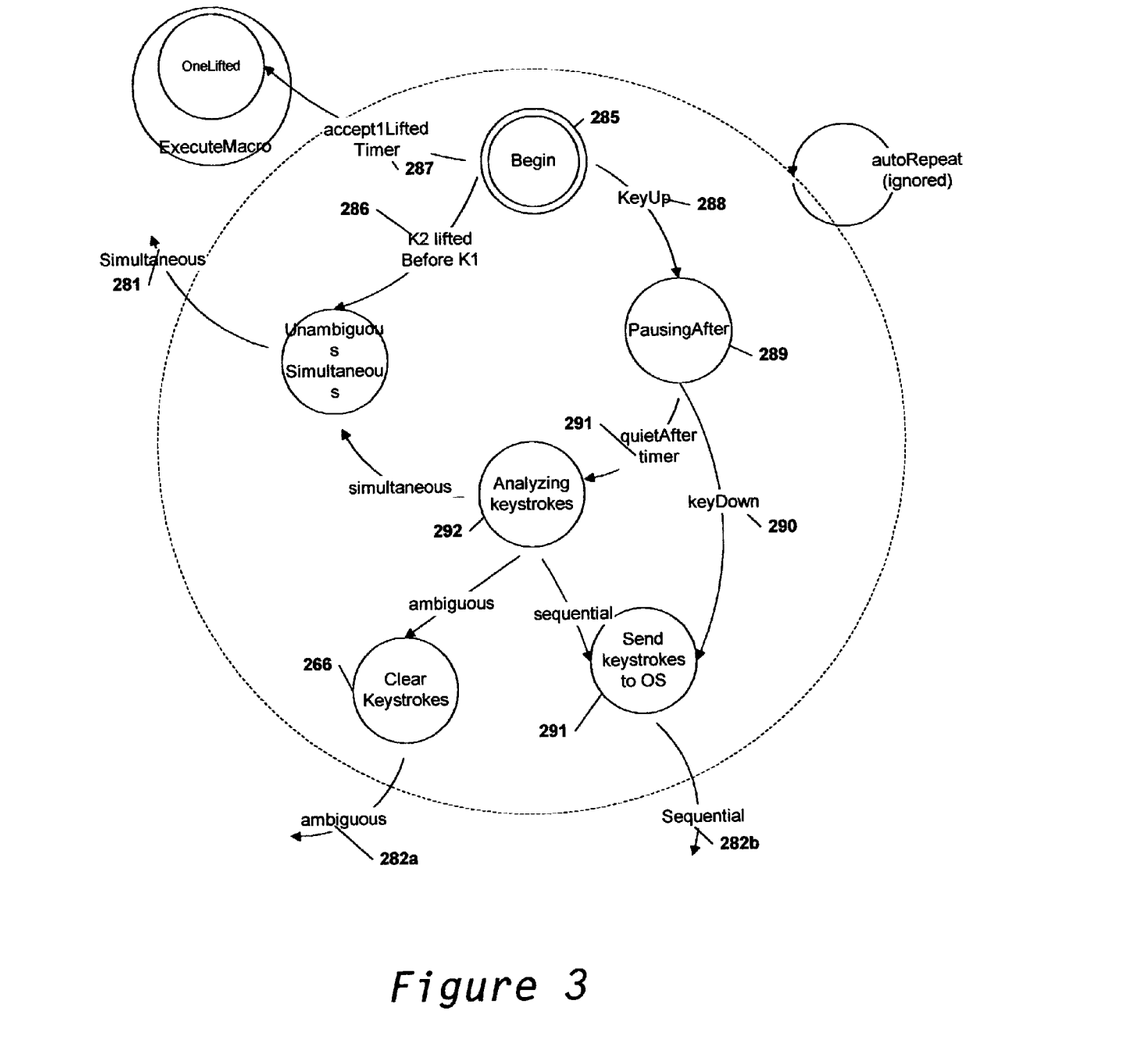
FIG. 3 shows the Ambiguity Resolution state #_280 in more detail, according to one embodiment of the invention.

FIG. 3 shows the AmbiguityResolution state #_280 in more detail. Entry to the compound state AmbiguityResolution state 280 is a transition to the Begin state #_285. At this point, two keys have been pressed, and one has been lifted. If the second key was lifted before the first, the machine 631 conclusively classifies the gesture as simulaneous, transition 286.

Otherwise, the machine 631 starts the AcceptOneKeyLifted timer. If the machine receives no keystroke before the timer fires, on the firing of the timer, the machine 631 conclusively classifies the gesture as simultaneous and transitions to the OneLifted state 279 in the ExecuteMacro compound state 270, transition 287. The user may lift one finger after pressing both keys in order to pause the macro and then restart or repeat the macro by pressing the lifted key again.

If the second key is lifted before AcceptOneKeyLifted ms elapses, then the state machine 631 transitions to the PausingAfter state 289, transition 288 and starts the QuietAfterMacro timer. If a keydown event occurs before this time elapses, then the machine 631 conclusively concludes that user's gesture is sequential typing and transitions to the SendKeystrokesToOS state 290, transition 290.

If no keyup events occur during the QuietAfterMacro interval, the state machine 631 transitions to the AnalyzingKeystrokes state 292, transition 291.

Figure 4:
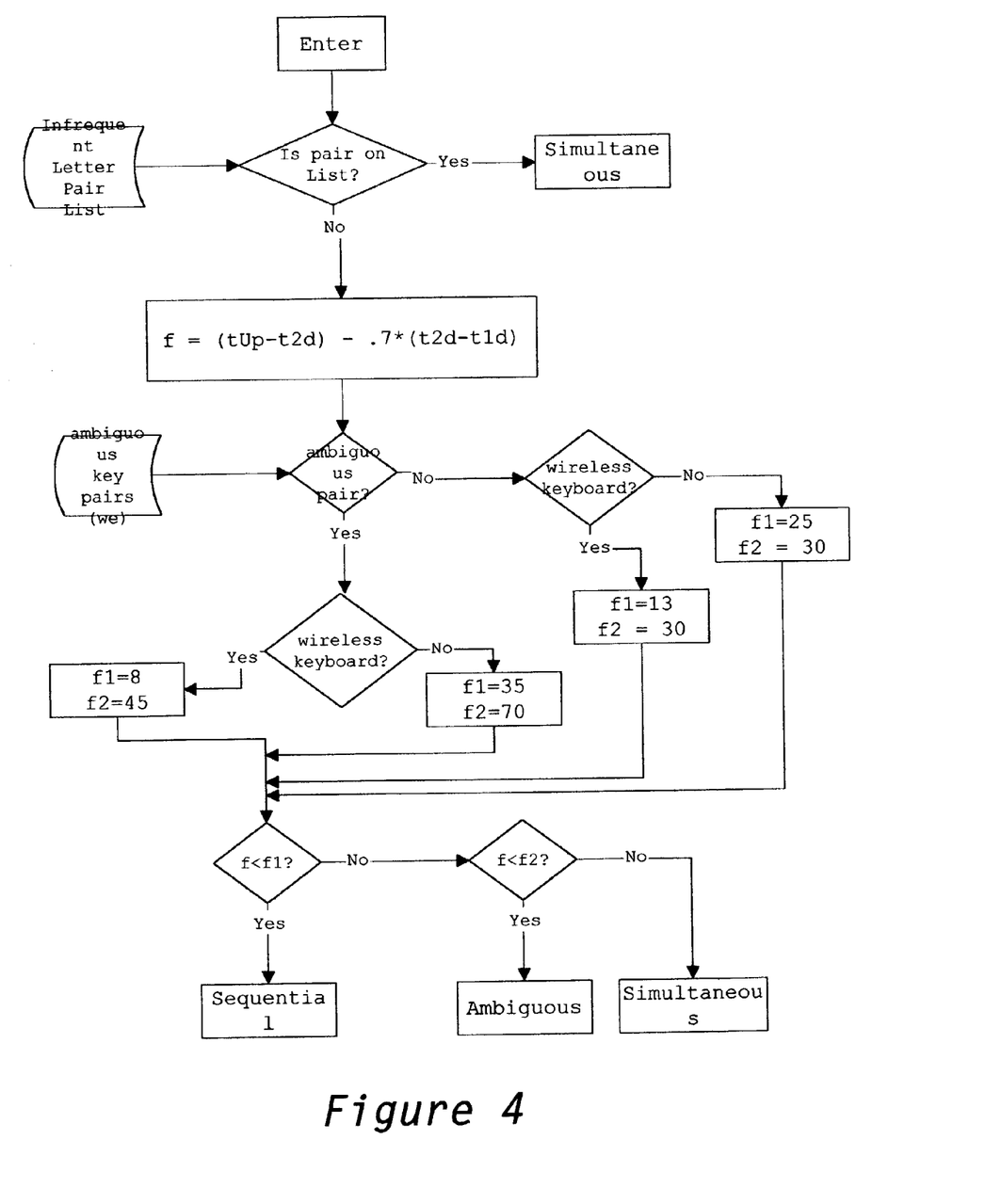
FIG. 4 illustrates the analysis of the keystroke data in the AnalyzingKeystrokes state #_292, according to one embodiment of the invention.

In the AnalyzingKeystrokes state 292, the user has paused, pressed two keys, released them and paused again. FIG. 4 illustrates the analysis of the keystroke data. Applying a linear discriminant analysis to the data of Table 3 yields a function which indicates the probability that a sequence is simultaneous. The function increases as the time interval during which both keys were pressed increases but decreases as the time between the two initial keyDown events increases. A low value for this function indicates sequential keystrokes. A high value indicates simultaneous keystrokes, and an intermediate value is ambiguous. The results of a linear discriminant analysis applied to the data in Table 3 yield a function of the form:

$$F = \text{(time both keys are down)} - 0.7 \ast \text{(time between first and second keydown)}. \qquad (2)$$

In Table 3, values of the function of 12 or less always indicate sequential keystrokes, values of 43 and higher always indicate simultaneous keystrokes and intermediate values are ambiguous.

Classification errors for values between 12 and 43 disappear if the wireless keyboard data are removed from the table. Timing data for wireless keyboards is inherently noisy due to delays in transmission and reception of the keystroke. Thus, in one embodiment, different ranges of the function are used to classify the sequences, depending on whether the keyboard is wireless or directly wired.

Figure 5:
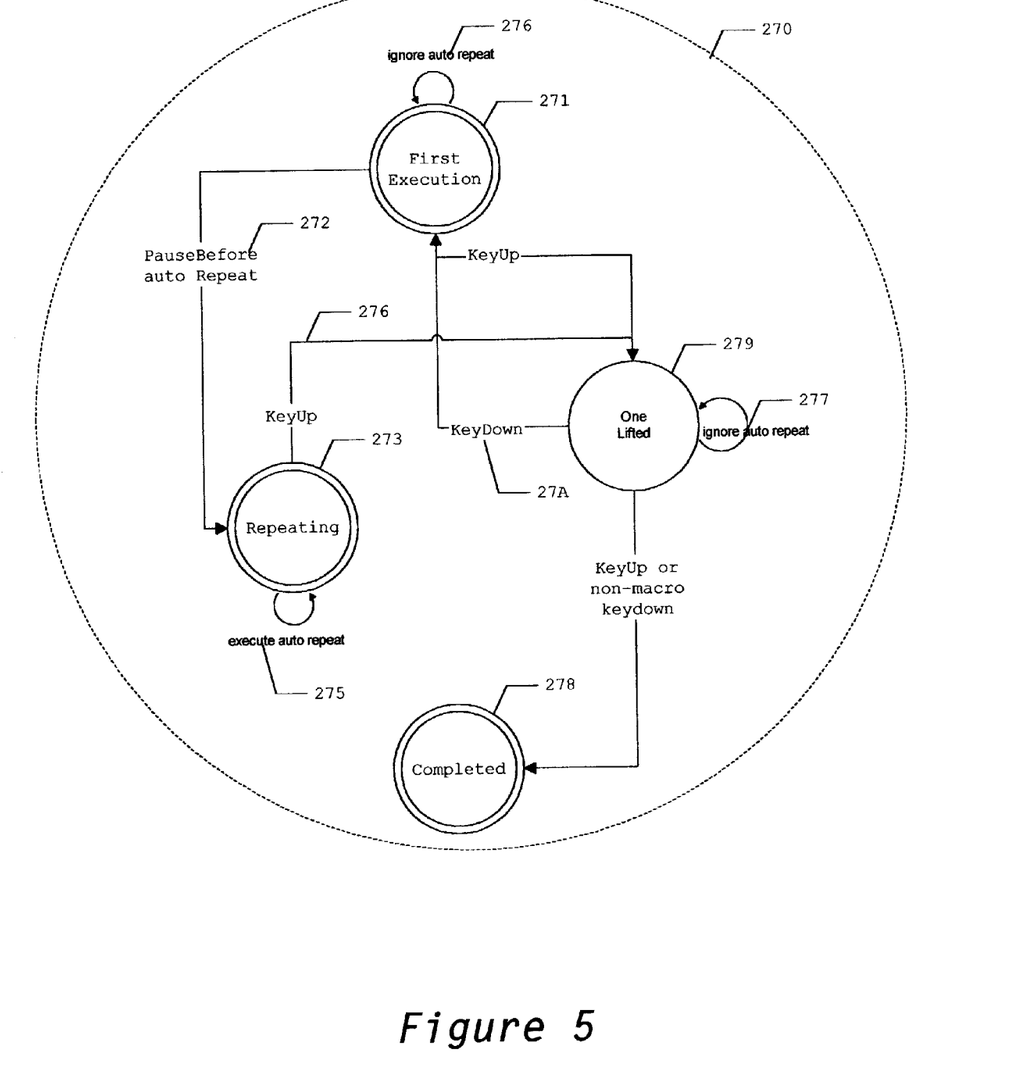
FIG. 5 further illustrates the ExecuteMacro meta-state, according to one embodiment of the invention.

FIG. 5 further illustrates the ExecuteMacro state 270. This state contains internal states that allow the user to control, by lifting one of the two simultaneously depressed keys, the repeated execution of the macro due to the operating system's normal auto-repeat feature. On entry to the FirstExecution state 271, the machine 631 sets the PauseBeforeAutoRepeat timer which simulates the behavior of the operating system when a key is held down. Since the system has spent several milliseconds in previous states since the first key of the pair was depressed, the system waits the additional PauseBeforeAutoRepeat time after the macro is first executed before accepting auto-repeat characters, transition 272. Thus, the machine 631 ignores auto-repeat events in this state.

If PauseBeforeAutoRepeat ms elapse since the macro was executed (determined by retrieving the system's pause before auto repeat time), the system enters the Repeating state 273. The Windows™ system registry, for example, stores the autorepeat time in the key HKKEY_CURRENT_USER\ControlPanel\Keybd:InitialDelay.

In the Repeating state 273, autorepeat events repeat the execution of the macro, transition 275. This continues until the user key lifts a key. The machine 631 then transitions to the OneKeyLifted state 279, transition 276.

In the OneLifted state 279, the machine 631 ignores the auto repeat events, transition 277. A keydown event for the lifted key returns the machine 631 to the FirstExecution state 271, transition 27A, where the delay is simulated again by the PauseBeforeAutoRepeat timer. A keyup or a keydown which does not correspond to the lifted character in this state completes the execution of the macro and transitions the machine 631 to the Completed state 278, transition 27B.

The instant invention reduces the frequency of false positive errors by only considering sequences in which the user pauses before initiating a macro and pauses again after releasing the two keys. Table 2A illustrates the keystroke timing data for a 70 wpm typist typing the sentence, "The price is €200." (using the invention's eu macro for the Euro symbol).

Table 1 shows the average time between keyboard events for various typing speeds. A typing speed of 70 wpm equates to an average time between events of 71.43 ms. As the data show, the operator spontaneously paused for 325 ms before striking the 'eu' key pair and another 500 ms after lifting both keys. Thus, for fairly proficient typists, the system can distinguish between normal connected typing and pausing.

Table 1 shows that slower typists are less likely to produce rollovers. Indeed, there are none in the example. Also, in keeping with their slower rhythm, slower typists, pause for a longer time before initiating the macro sequence.

Therefore, in various embodiments, a computer monitors the user's typing and adjusts one or more pause times to the user's typing speed. In another embodiments, a computer allows the user to manually do so. Table 1 also shows the average time between events and the pause time for various typing speeds, according to one embodiment.

Indeed, the invention now being fully described, one of ordinary skill in the art will readily appreciate the many changes and modifications that can be made thereto without departing from the spirit or scope of the appended claims. For example, while the examples focus on two-key macros, macros of three or more keys are also possible.

As another example, an embodiment of the invention may replace many of the hard-to-remember macros used in common applications. The Microsoft® Word™ word processor Ctrl-[ and Ctrl-] macros respectively increase and decrease the font size of a selection. These may be replaced by the mnemonic f+ and f−.

Likewise, the mnemonic macro eu can replace the NumLock Alt 0128 sequence that produces the euro symbol, '€'. Indeed, Table 4 lists a number of mnemonic European key pairs. The keys typed as '6' (for '^') '/' '\' ';' (for ':') '.' and ''' appear to the user to be automatically paired with a vowel character to accent it.

As still another example, the analysis to produce the function determining the probability of simultaneity was a discriminant analysis. A neural network can produce the probability function, as can any other probability analysis known in the art.

Still further, a population of computer users suffers from repetitive stress and other conditions requiring them to minimize their use of the mouse. These users would be well served by activating system commands without lifting their hands from the keyboard.

TABLE 1

| typing speed | slow | slow chars/sec | high avg ms between events | quietBefore | quietAfter |
|---|---|---|---|---|---|
| 10 | 7 | 0.70 | 714.29 | 1000 | 750 |
| 20 | 14 | 1.40 | 357.14 | 600 | 450 |
| 30 | 21 | 2.10 | 238.10 | 500 | 375 |
| 40 | 28 | 2.80 | 178.57 | 400 | 300 |
| 50 | 35 | 3.50 | 142.86 | 300 | 225 |
| 60 | 42 | 4.20 | 119.05 | 250 | 187.5 |
| 70 | 49 | 4.90 | 102.04 | 250 | 187.5 |
| 80 | 56 | 5.60 | 89.29 | 250 | 187.5 |
| 90 | 63 | 6.30 | 79.37 | 250 | 187.5 |
| 100 | 70 | 7.00 | 71.43 | 250 | 187.5 |
| 110 | 77 | 7.70 | 64.94 | 150 | 112.5 |
| 120 | 84 | 8.40 | 59.52 | 125 | 93.75 |
| 130 | 91 | 9.10 | 54.95 | 125 | 93.75 |
| 140 | 98 | 9.80 | 51.02 | 125 | 93.75 |
| 150 | 105 | 10.50 | 47.62 | 125 | 93.75 |
| 160 | 112 | 11.20 | 44.64 | 125 | 93.75 |

Table 1 shows suggested calculations for quietBefore and quietAfter parameters, based on the average time between events. Empirically (and illustrated in Tables 2A–2C), the longest interval between naturally occuring keyboard events is based on a typing speed approximately 30% less than the average rate. Also, as borne out by the data in Tables 2A–2C, the pause after a macro invocation tends to be shorter than the pause afterwards.

TABLE 2A

| character | action | time | state | delta t | notes |
|---|---|---|---|---|---|
| T | ds | 20873264 | Typing | 0 | |
| T | us | 20873404 | Typing | 140 | |
| | u | 20873454 | Typing | 50 | |
| H | d | 20873554 | Typing | 100 | |
| H | u | 20873664 | Typing | 110 | |
| E | d | 20873774 | 1Dn | 110 | |
| E | u | 20873875 | Typing | 101 | |
| | d | 20874005 | Typing | 130 | |
| | u | 20874145 | Typing | 140 | |
| P | d | 20874215 | Typing | 70 | |
| P | u | 20874345 | Typing | 130 | |
| R | d | 20874385 | 1Dn | 40 | |
| R | u | 20874465 | Typing | 80 | |
| I | d | 20874596 | Typing | 131 | |
| I | u | 20874696 | Typing | 100 | |
| C | d | 20874736 | Typing | 40 | |
| C | u | 20874826 | Typing | 90 | |
| E | d | 20875016 | 1Dn | 190 | |
| E | u | 20875126 | Typing | 110 | |
| | d | 20875166 | Typing | 40 | |
| | u | 20875287 | Typing | 121 | |
| I | d | 20875317 | Typing | 30 | |
| I | u | 20875427 | Typing | 110 | |
| S | d | 20875537 | Typing | 110 | |
| S | u | 20875657 | Typing | 120 | |
| | d | 20875777 | Typing | 120 | |
| | u | 20875897 | Typing | 120 | |
| U | d | 20876618 | 1Dn | 721 | pause |
| E | d | 20876659 | 2Dn | 41 | |
| U | u | 20876729 | 1Up | 70 | |
| E | u | 20876779 | 3QAfter | 50 | |
| 2 d | | 20877239 | Typing | 460 | pause |
| 2 u | | 20877370 | Typing | 131 | |
| 0 d | | 20877480 | Typing | 110 | |
| 0 u | | 20877570 | Typing | 90 | |
| 0 d | | 20877750 | Typing | 180 | |
| 0 u | | 20877860 | Typing | 110 | |
| — | d | 20878301 | 1Dn | 441 | |
| — | u | 20878411 | Typing | 110 | |
| | ds | 20891750 | Paused | 13339 | |

Table 2A shows, for a 40 wpm typist, the character typed, whether the stroke is down or up, the time of the event, the state to which a transition occurs as a result of the input, the difference in time between the event and the previous event.

TABLE 2B

| character | action | time | state | delta t |
|---|---|---|---|---|
| T | ds | 20935683 | Typing | 0 |
| T | u | 20935824 | Typing | 141 |
| H | d | 20935864 | Typing | 40 |
| H | u | 20935954 | Typing | 90 |
| E | d | 20936054 | 1Dn | 100 |
| E | u | 20936134 | Typing | 80 |
| | d | 20936174 | Typing | 40 |
| | u | 20936284 | Typing | 110 |
| P | d | 20936334 | Typing | 50 |
| P | u | 20936455 | Typing | 121 |
| R | d | 20936495 | 1Dn | 40 |
| R | u | 20936565 | Typing | 70 |
| I | d | 20936655 | Typing | 90 |
| I | u | 20936755 | Typing | 100 |
| C | d | 20936795 | Typing | 40 |
| C | u | 20936865 | Typing | 70 |
| E | d | 20937005 | 1Dn | 140 | rollover wi |
| | d | 20937065 | Typing | 60 |
| E | u | 20937115 | Typing | 50 |
| | u | 20937216 | Typing | 101 |
| I | d | 20937256 | Typing | 40 |

TABLE 2B-continued

| character | action | time | state | delta t | |
|---|---|---|---|---|---|
| I | u | 20937326 | Typing | 70 | |
| S | d | 20937406 | Typing | 80 | |
| S | u | 20937486 | Typing | 80 | |
| | d | 20937636 | Typing | 150 | |
| | u | 20937736 | Typing | 100 | |
| E | d | 20938397 | 1Dn | 661 | paused |
| U | d | 20938437 | 2Dn | 40 | |
| E | u | 20938497 | 1Up | 60 | |
| U | u | 20938548 | 3QAfter | 51 | |
| 2 d | | 20939128 | Typing | 580 | pause afte |
| 2 u | | 20939229 | Typing | 101 | |
| 0 d | | 20939269 | Typing | 40 | |
| 0 u | | 20939369 | Typing | 100 | |
| 0 d | | 20939459 | Typing | 90 | |
| 0 u | | 20939559 | Typing | 100 | |
| — | d | 20940030 | 1Dn | 471 | |
| — | u | 20940150 | Typing | 120 | |

Table 2B shows, for a 55 wpm typist, the character typed, whether the stroke is down or up, the time of the event, the state to which a transition occurs as a result of the input, the difference in time between the event and the previous event.

TABLE 2C

| character | action | time | state | delta t | notes |
|---|---|---|---|---|---|
| T | ds | 21095183 | Typing | 0 | ds = down s |
| T | us | 21095293 | Typing | 110 | |
| H | d | 21095373 | Typing | 80 | |
| H | u | 21095423 | Typing | 50 | |
| E | d | 21095463 | 1Dn | 40 | |
| E | u | 21095523 | Typing | 60 | |
| | d | 21095563 | Typing | 40 | rollover |
| P | d | 21095633 | Typing | 70 | rollover |
| | u | 21095683 | Typing | 50 | rollover |
| R | d | 21095724 | 1Dn | 41 | p&r down |
| P | u | 21095774 | Typing | 50 | |
| R | u | 21095824 | Typing | 50 | |
| I | d | 21095884 | Typing | 60 | |
| I | u | 21095964 | Typing | 80 | |
| C | d | 21096014 | Typing | 50 | |
| C | u | 21096074 | Typing | 60 | |
| E | d | 21096184 | 1Dn | 110 | |
| E | u | 21096254 | Typing | 70 | |
| | d | 21096294 | Typing | 40 | |
| | u | 21096435 | Typing | 141 | |
| I | d | 21096475 | Typing | 40 | |
| I | u | 21096525 | Typing | 50 | |
| S | d | 21096575 | Typing | 50 | |
| S | u | 21096655 | Typing | 80 | |
| | d | 21096695 | Typing | 40 | |
| | u | 21096815 | Typing | 120 | |
| | timer | 21097015 | Paused | 200 | |
| U | d | 21097106 | 1Dn | 91 | eu€ macr |
| E | d | 21097146 | 2Dn | 40 | |
| U | u | 21097206 | 1Up | 60 | |
| E | u | 21097246 | 3QAfter | 40 | |
| 2 d | | 21097646 | Typing | 400 | |
| 2 u | | 21097736 | Typing | 90 | |
| 0 d | | 21097787 | Typing | 51 | |
| 0 u | | 21097867 | Typing | 80 | |
| 0 d | | 21097937 | Typing | 70 | |
| 0 u | | 21098027 | Typing | 90 | |
| — | d | 21098167 | Typing | 140 | |
| — | u | 21098267 | Typing | 100 | |

Table 2C shows, for a 75 wpm typist, the character typed, whether the stroke is down or up, the time of the event, the state to which a transition occurs as a result of the input, the difference in time between the event and the previous event.

TABLE 3

| 2d down | bothDown | chars | | kbd | | | | |
|---|---|---|---|---|---|---|---|---|
| 60 | 0 | sequential | th | serial connect | −42 | | | |
| 60 | 0 | sequential | th | serial connect | −42 | | | |
| 50 | 0 | sequential | th | serial connect | −35 | | | |
| 60 | 10 | sequential | df | serial connect | −32 | | | |
| 60 | 20 | sequential | ei | serial connect | −22 | | | |
| 60 | 20 | sequential | eu | serial connect | −22 | | | |
| 60 | 20 | sequential | eu | serial connect | −22 | | | |
| 60 | 20 | sequential | we | serial connect | −22 | | | |
| 50 | 20 | sequential | as | serial connect | −15 | | | |
| 50 | 20 | sequential | ei | serial connect | −15 | | | |
| 50 | 20 | sequential | eu | serial connect | −15 | | | |
| 60 | 30 | sequential | df | serial connect | −12 | | | |
| 60 | 30 | sequential | ei | serial connect | −12 | | | |
| 60 | 30 | sequential | we | serial connect | −12 | | | |
| 40 | 20 | sequential | as | serial connect | −8 | | | |
| 40 | 20 | sequential | ie | serial connect | −8 | | | |
| 40 | 20 | sequential | th | serial connect | −8 | | | |
| 50 | 30 | sequential | df | serial connect | −5 | | | |
| 50 | 30 | sequential | we | serial connect | −5 | | | |
| 60 | 40 | sequential | we | wireless | −2 | | | |
| 30 | 20 | sequential | eu | serial connect | −1 | | | |
| 30 | 20 | sequential | ie | serial connect | −1 | | | |
| 60 | 41 | sequential | eu | wireless | −1 | | | |
| 50 | 40 | sequential | eu | wireless | 5 | | | |
| 20 | 20 | sequential | ie | serial connect | 6 | | | |
| 20 | 20 | sequential | ie | serial connect | 6 | | | |
| 30 | 30 | sequential | as | serial connect | 9 | | | |
| 30 | 30 | sequential | df | serial connect | 9 | | | |
| 30 | 30 | sequential | ei | serial connect | 9 | | | note: we wi amb = ambiguity for the sequence 'we' on a wireless keyboard |
| 30 | 30 | sequential | we | serial connect | 9 | | | |
| 40 | 40 | sequential | df | serial connect | 12 | | | |
| 50 | 50 | simultaneous | eu | error | wireless | 15 | we wi amb | wireless amb |
| 50 | 50 | simultaneous | eu | error | wireless | 15 | we wi amb | wireless amb |
| 50 | 50 | simultaneous | we | error | wireless | 15 | we wi amb | wireless amb |
| 50 | 51 | sequential | we | | wireless | 16 | we wi amb | wireless amb |
| 60 | 60 | sequential | we | | wireless | 18 | we wi amb | wireless amb |
| 30 | 40 | sequential | as | | serial connect | 19 | we wi amb | wireless amb |
| 40 | 50 | sequential | eu | error | wireless | 22 | we wi amb | wireless amb wired ambiguity |
| 40 | 50 | sequential | we | error | wireless | 22 | we wi amb | wireless amb wired ambiguity |
| 40 | 50 | simultaneous | we | | wireless | 22 | we wi amb | wireless amb wired ambiguity |
| 20 | 40 | simultaneous | eu | | serial connect | 26 | we wi amb | |
| 41 | 60 | simultaneous | eu | | wireless | 31.3 | we wi amb | |
| 40 | 60 | simultaneous | we | | wireless | 32 | we wi amb | |
| 50 | 70 | simultaneous | eu | | wireless | 35 | we wi amb | |
| 50 | 70 | simultaneous | eu | | wireless | 35 | we wi amb | |
| 20 | 50 | simultaneous | eu | | serial connect | 36 | we wi amb | |
| 20 | 50 | simultaneous | eu | | serial connect | 36 | we wi amb | |
| 20 | 50 | simultaneous | ie | | serial connect | 36 | we wi amb | |
| 20 | 50 | simultaneous | ie | | serial connect | 36 | we wi amb | |
| 20 | 50 | simultaneous | ie | | serial connect | 36 | we wi amb | |
| 40 | 70 | sequential | we | error | wireless | 42 | we wi amb | |
| 40 | 70 | sequential | we | error | wireless | 42 | we wi amb | |
| 40 | 70 | simultaneous | we | | wireless | 42 | we wi amb | |
| 40 | 70 | simultaneous | we | | wireless | 42 | we wi amb | |
| 10 | 50 | simultaneous | eu | | serial connect | 43 | | |
| 20 | 60 | simultaneous | eu | | serial connect | 46 | | |
| 20 | 60 | simultaneous | eu | | serial connect | 46 | | |
| 20 | 60 | simultaneous | ie | | serial connect | 46 | | |
| 20 | 60 | simultaneous | ie | | serial connect | 46 | | |
| 20 | 70 | simultaneous | ie | | serial connect | 56 | | |
| 0 | 60 | simultaneous | df | | serial connect | 60 | | |
| 0 | 60 | simultaneous | th | | serial connect | 60 | | |
| 0 | 70 | simultaneous | as | | serial connect | 70 | | |
| 0 | 70 | simultaneous | th | | serial connect | 70 | | |
| 0 | 70 | simultaneous | th | | serial connect | 70 | | |
| 0 | 70 | simultaneous | we | | serial connect | 70 | | |
| 0 | 70 | simultaneous | we | | serial connect | 70 | | end 0 ser |
| 0 | 70 | simultaneous | we | | serial connect | 70 | | |
| 0 | 70 | simultaneous | we | | serial connect | 70 | | |
| 0 | 71 | simultaneous | as | | serial connect | 71 | | |

TABLE 3-continued

| 2d down | bothDown | chars | | kbd | |
|---|---|---|---|---|---|
| 0 | 71 | simultaneous | as | serial connect | 71 |
| 0 | 71 | simultaneous | we | serial connect | 71 |
| 0 | 71 | simultaneous | we | serial connect | 71 |
| 0 | 80 | simultaneous | as | serial connect | 80 |
| 0 | 80 | simultaneous | df | serial connect | 80 |
| 0 | 80 | simultaneous | th | serial connect | 80 |
| 0 | 81 | simultaneous | df | serial connect | 81 |
| 0 | 81 | simultaneous | th | serial connect | 81 |
| 0 | 90 | simultaneous | df | serial connect | 90 |
| 0 | 90 | simultaneous | df | serial connect | 90 |
| 0 | 90 | simultaneous | th | serial connect | 90 |
| 10 | 101 | simultaneous | as | serial connect | 94 |
| 0 | 101 | simultaneous | as | serial connect | 101 |
| 0 | 110 | simultaneous | df | serial connect | 110 |

TABLE 4

| | |
|---|---|
| eu | € |
| a6 | â (the '^' is the uppercase character for 6). |
| a/ | á |
| a\ | à |
| a; | ä (the colon is the uppercase character for semi-colon). |
| a. | å |
| a' | ã (the tilde is the uppercase character for '). |
| c, | ç |
| e/ | é |
| e\ | è |
| e: | ë |
| e6 | ê |
| i6 | î |
| i/ | í |
| i\ | ì |
| i: | ï |
| o6 | ô |
| o/ | ó |
| o\ | ò |
| o; | ö |
| o' | õ |
| n' | ñ tilde |
| u6 | û |
| u/ | ú |
| u\ | ù |
| u; | ü |
| y/ | ý |

What is claimed is:

1. A method for receiving data into a computer, the method comprising:
   associating multiple alphanumeric keys on a keyboard with data;
   detecting a pause during typing;
   detecting the simultaneous pressing of the multiple alphanumeric keys after the pause by;
      determining if a first of the multiple alphanumeric keys is part of a standard pair;
      determining if a second of the multiple alphanumeric keys is part of a standard pair;
      determine if the second of the multiple alphanumeric keys is depressed within a pre-determined period of time of the first of the multiple alphanumeric keys;
      determine if the first and second alphanumeric keys are both depressed for a period of time which is dependent upon the period of time elapsed between the first and second keypresses; and
   if the first and second alphanumeric keys have been depressed simultaneously then use the associated data instead of the multiple alphanumeric keys simultaneously pressed as input data.

2. The method of claim 1 wherein the step of detecting a pause comprises:
   detecting a pause perceptible to a user before the simultaneous pressing of the multiple alphanumeric keys.

3. The method of claim 1 wherein the step of detecting the simultaneous pressing of the multiple alphanumeric keys comprises:
   detecting a pause after the simultaneous pressing of the multiple alphanumeric keys.

4. The method of claim 1, further comprising:
   determining that the first and second alphanumeric keys have been depressed sequentially if a third alphanumeric key has been depressed during the period of time during which the first and second alphanumeric keys have been depressed.

5. The method of claim 1, further comprising:
   determining that the first and second alphanumeric keys have been depressed simultaneously if the second alphanumeric key is lifted prior to the first alphanumeric key being lifted.

6. The method of claim 1, further comprising:
   determining that the first and second alphanumeric keys have been depressed simultaneously if a pause during typing occurs after the first and second alphanumeric keys have been depressed and lifted.

7. A method for receiving data into a computer, the method comprising:
   associating multiple alphanumeric keys on a keyboard with data;
   detecting the simultaneous pressing of the multiple alphanumeric keys by:
      determining if a second of multiple alphanumeric keys is depressed before the previous key press of a first of multiple alphanumeric keys has been lifted;
      determining if the second alphanumeric key is depressed within a pre-determined period of time of the first alphanumeric key;
      determining if the first and second alphanumeric keys are both depressed for a period of time which is dependent upon the period of time elapsed between the first and second key presses; and
   if the first and second alphanumeric keys have been depressed simultaneously,
   determining if the first and second alphanumeric keys are a standard pair;

if they are a standard pair, using the associated data instead of the multiple alphanumeric keys simultaneously pressed as input data.

8. The method of claim 7 wherein the step of detecting the simultaneous pressing of the multiple alphanumeric keys further comprises determining first if the first depressed of the multiple alphanumeric keys is part of a standard pair.

9. The method of claim 7, further comprising determining if multiple alphanumeric keys are part of a standard pair as each key is depressed.

10. The method of claim 7 wherein the step of detecting the simultaneous pressing of the multiple alphanumeric keys further comprises determining if a pair of multiple alphanumeric keys is part of a standard pair after the second key of the pair has been depressed.

11. The method of claim 7 wherein the step of detecting the simultaneous pressing of the multiple alphanumeric keys further comprises detecting a pause before the simultaneous pressing of the multiple alphanumeric keys.

12. The method of claim 7, further comprising determining that the first and second alphanumeric keys have been depressed sequentially if a third alphanumeric key has been depressed during the period of time during which the first and second alphanumeric keys have been depressed.

13. The method of claim 7, further comprising determining that the first and second alphanumeric keys have been depressed simultaneously if the second alphanumeric key is lifted prior to the first alphanumeric key being lifted.

14. The method of claim 7, further comprising determining that the first and second alphanumeric keys have been depressed simultaneously if a pause during typing occurs after the first and second alphanumeric keys have been depressed and lifted.

15. A method for receiving data into a computer, the method comprising:
  associating multiple alphanumeric keys on a keyboard with data;
  detecting a pause during typing;
  detecting the simultaneous pressing of the multiple alphanumeric keys by:
    determining if a second of multiple alphanumeric keys is depressed before the previous key press of a first of multiple alphanumeric keys has been lifted;
    determining if the second alphanumeric key is depressed within a pre-determined period of time of the first alphanumeric key;
    determining if the first and second alphanumeric keys are both depressed for a period of time which may be pre-determined or which may be dependent upon the period of time elapsed between the first and second key presses; and
  if the first and second alphanumeric keys have been depressed simultaneously, determining if the first and second alphanumeric keys are a standard pair; and
  if they are a standard pair, using the associated data instead of the multiple alphanumeric keys simultaneously pressed as input data.

16. The method of claim 15 wherein the step of detecting the simultaneous pressing of the multiple alphanumeric keys further comprises determining first if the first depressed of the multiple alphanumeric keys is part of a standard pair.

17. The method of claim 15, further comprising determining if multiple alphanumeric keys are part of a standard pair as each key is depressed.

18. The method of claim 15 wherein the step of detecting the simultaneous pressing of the multiple alphanumeric keys further comprises determining if a pair of multiple alphanumeric keys is part of a standard pair after the second key of the pair has been depressed.

19. The method of claim 15 wherein the pause is detected before the simultaneous pressing of the multiple alphanumeric keys.

20. The method of claim 15, further comprising determining that the first and second alphanumeric keys have been depressed sequentially if a third alphanumeric key has been depressed during the period of time during which the first and second alphanumeric keys have been depressed.

21. The method of claim 15, further comprising determining that the first and second alphanumeric keys have been depressed simultaneously if the second alphanumeric key is lifted prior to the first alphanumeric key being lifted.

22. The method of claim 15, further comprising determining that the first and second alphanumeric keys have been depressed simultaneously if the first and second alphanumeric keys are both depressed for a period of time which is dependent upon the period of time elapsed between the first and second key presses.

23. The method of claim 15, further comprising determining that the first and second alphanumeric keys have been depressed simultaneously if a pause during typing occurs after the first and second alphanumeric keys have been depressed and lifted.

* * * * *